(12) United States Patent
Lauritsen

(10) Patent No.: US 6,979,171 B2
(45) Date of Patent: Dec. 27, 2005

(54) MARITIME ENERGY GENERATING DEVICE

(76) Inventor: Per Lauritsen, Solbjerghedevej 208, 8355 Solbjerg (DK)

( * ) Notice: Subject to any disclaimer, the term of this patent is extended or adjusted under 35 U.S.C. 154(b) by 55 days.

(21) Appl. No.: 10/240,255

(22) PCT Filed: Mar. 27, 2001

(86) PCT No.: PCT/DK01/00205

§ 371 (c)(1),
(2), (4) Date: Apr. 17, 2003

(87) PCT Pub. No.: WO01/73292

PCT Pub. Date: Oct. 4, 2001

(65) Prior Publication Data

US 2004/0103655 A1 Jun. 3, 2004

(30) Foreign Application Priority Data

Mar. 28, 2000 (DK) .................................. 2000 00519

(51) Int. Cl.[7] .................................................. F03D 7/02
(52) U.S. Cl. ......................... 415/4.3; 415/908; 416/85
(58) Field of Search .............................. 290/44; 415/4.1, 415/4.2, 4.3, 908; 416/85

(56) References Cited

U.S. PATENT DOCUMENTS 3,736,898 A * 6/1973 Yamura ........................ 114/45
4,553,037 A 11/1985 Veazey ........................ 290/55

FOREIGN PATENT DOCUMENTS

| DE | 31 07 252 | 9/1982 |
|----|-----------|--------|
| DE | 32 24 976 | 1/1984 |
| DE | 198 46 796 | 4/2000 |
| DK | 173018 | 12/1995 |
| FR | 542 172 | 8/1922 |
| FR | 943 749 | 3/1949 |
| SE | 374069 | 2/1975 |
| WO | WO 99/02856 | 1/1999 |

* cited by examiner

Primary Examiner—Edward K. Look
Assistant Examiner—Dwayne J. White
(74) Attorney, Agent, or Firm—Cantor Colburn LLP (57) ABSTRACT

A maritime energy generating device including a windmill mounted on a floating foundation, the windmill having a machine compartment mounted at the top of a tower and the foundation being fixed to the bottom of a water body by a connection and including two tanks and a unit for shifting liquid between the tanks and the tanks and the surroundings.

28 Claims, 7 Drawing Sheets

MARITIME ENERGY GENERATING DEVICE

BACKGROUND OF THE INVENTION

The present invention relates to a maritime energy generating device.

So far, windmills for mounting at sea have been developed in accordance with the concept of windmills on land. This means that the windmills generally correspond to the windmills on land with the exception that their foundation is fixedly anchored to the bottom of the sea and of larger dimensions which also makes them more expensive than corresponding foundations on land. The reason for the expensive foundations is that they must raise the windmill to a level corresponding to that of the sea depth and add the risk level at high tide while also being dimensioned for, hummocking, storms, upward pressure etc. Thus, the windmill foundations for windmills at sea are quite expensive.

Another significant added cost associated with windmills at sea stems from the fact that the work with the foundation and the mounting of the windmill must take place at sea and often far away from a harbour. The mounting must be carried out by means of very large floating cranes and may only be carried out in very calm weather. This increases costs and makes the inclusion of idle time/waiting time necessary.

A third added cost by operation of windmills at sea is that the windmills require current maintenance and renovation. When replacing components of certain dimensions in the windmills, the problems known from mounting by means of floating crane and the idle time will repeat themselves.

Finally, the cost associated with removing windmills at sea after they have been worn out or become technically obsolete will be significant. This is particularly true in relation to the removal of the foundations.

Still, examples of windmills mounted on a floating foundation have been used in connection with the known techniques. A typical example of such a floating windmill can be seen in DE-A 31 07 252.

However, known maritime floating windmills of the above-mentioned type are experiencing serious stability problems which, in turn, lead to increased wear and tear on especially the windmill itself but also on the mechanical parts forming part of it.

Another example can be seen in DE-A 32 24 976 in which a maritime energy generating device comprises several windmills, each placed on a floating foundation.

The floating foundations have been connected through flexible arms to a common floating middle part anchored to the bottom of the sea by means of several anchors. The flexible arms may absorb any potential vertical shifting caused by e.g. high seas.

However, the latter example is associated with significant problems in its construction. This includes the fact that the mechanical system comprising the flexible arms is not suitable for use in an aggressive environment such as open sea as the components of the system are in direct contact with the environment. Correspondingly, the system is only suitable for small windmills due to its construction and form since high windmill towers would easily make the foundation tip.

The purpose of the invention is e.g. to create a maritime energy generating device suitable for continuous and stable energy production. This includes performance at sea during most weather conditions.

SUMMARY OF THE INVENTION

By the foundation comprising at least two tanks and at least one unit for shifting liquid between the tanks or the tanks and the surroundings, it is possible to change the position of the foundation in an advantageous manner.

In this manner, the windmill—and especially the part of the windmill placed high above the surface—is in a stable position irrespective of the weather conditions which is quite advantageous since even small movements by the windmill will result in a significant increase of the strain and wear and tear on the various elements of the windmill such as the wings, the moveable mechanical parts and the generators. The reliability of operation of a windmill according to the invention is thus increased in comparison with the known maritime systems in which windmills form part.

Furthermore, the use of a yaw system in the windmill is not necessary which decreases the weight of the windmill and shifts the center of gravity closer to sea level which eases stabilisation of the energy plant. Also, it saves money and increases reliability of operation even further since the yaw system presents an inherent risk of mechanical breakdown. Such a break-down may cause the energy generating device to overturn if the break-down means that yawning is impossible while the generating device is fixedly anchored.

Also, it is possible to change the position of the foundation so that it is levelled with the sea level.

Furthermore, an energy generating device is created which is mobile and inexpensive to produce and maintain as opposed to the known generators.

This is due to the fact that the use of a floating foundation makes it possible to construct, assemble and test the windmill at a location other than the mounting location and subsequently transport the windmill to the mounting location as a raft.

Similarly, it will be easy to move the windmill from one mounting location to a new place of use. In addition, it will be possible to raft the windmill to a suitable place for repairs or scrap.

By "floating" is meant that the foundation may both float on the water surface but also below the surface, and particularly right below the surface. By "Water surface" is meant any given surface on a lake, inlet or ocean.

By "tower" is meant the part of the windmill carrying the machine compartment (nacelle) and the rotor in the shape of the windmill wings above the foundation. The tower may e.g. be a piping tower, such as a conical piping tower, or an open construction, such as a mesh construction, or a wired/stiffened piping tower or an open construction or combinations of the possibilities.

By the tower being constructed in a shape which is asymmetrical and aerodynamic in the direction of the wind, it is possible to limit the wind shadow to which the rotor of the windmill is exposed quite significantly. Since the rotor cuts through the machine compartment and is fixedly mounted onto the tower, this is very advantageous and will result in additional production of electricity in comparison with symmetrical towers. Also, the aerodynamic construction means that less turbulence is created on the account of the tower.

By the tower being constructed in a shape which is slimmer in the direction of the wind than in the cross direction of the wind, an advantageous embodiment of the invention may be obtained.

By letting the connection between the foundation and the bottom of a sea or a lake be one or more anchor ropes or chains, it is possible to keep the foundation at a given location without the risk of the construction floating and thereby posing a risk to other vessels.

By the foundation furthermore having a connection to one or more electrical cables for transfer of the energy produced by the energy generating device to the place of use, an advantageous embodiment has been obtained.

By the foundation being fixed to the bottom of the sea or a lake by means of one or more anchors, it is possible to fix the foundation to a given location in a simple manner while at the same time allowing the foundation to rotate around the anchor or anchors if placed in close proximity of each other.

By the foundation being rectangular in the direction of the wind and/or water flow, it is possible to limit the effect of the weather conditions on the energy generating device. This is due to the fact that the mentioned shape will constitute a limited profile to the water flow in particular and thereby reduce resistance which, in turn, means that such a foundation will be more stable in the water.

By the foundation being constructed with at least two pontoons which are mutually connected by at least one transverse bar, it is possible to ensure a large degree of uplift pressure and stability in relation to the size and weight of the foundation as generally known from sailing boat of the katamaran type.

By the foundation comprising bulkheads on the inside which divide the foundation into at least two tanks, it is possible to change the position of the foundation in relation to sea level in an advantageous way by changing the amount of liquid in the tanks and thereby shift the balance by means of the amounts of liquid in the tanks. Similarly, the bulkheads contribute to increasing the stiffness of the foundation and thereby the stability of the foundation.

By at least one of the tanks comprising a number of open bulkheads, it is possible to increase the stiffness of the foundation further while also avoiding a potential "baffles" effect from the liquid in the tanks.

By at least one of the tanks featuring one or more drain openings placed at the bottom of the tank, it is possible to even out differences in the amount of liquid in a tank.

By at least one of the tanks featuring a pressure compensation device, an advantageous embodiment of the invention has been obtained.

By the unit for shifting liquid comprising one or more compressors for changing the air pressure in one or more of the tanks, an inexpensive and reliable manner of shifting the liquid in the foundation has been obtained.

By the unit for shifting liquid comprising one or more pumps such as submerged pumps, it is possible to shift the liquid in the foundation in an inexpensive manner.

By each of the two pontoons being provided with at least two tanks and at least one pump for pumping liquid between the tanks or the tanks and the surroundings, an advantageous way of changing the position of the foundation at a certain level and angle in relation to sea level has been obtained.

By the unit for shifting liquid being controlled by an angle and level measuring device placed on said energy generating device, it is possible to control the angle and level of the foundation in relation to sea level. This includes submerging the foundation below sea level in cases of high seas or raising the foundation in cases of gentle breeze in order to let the windmill go as high as possible.

By the angle and level measuring device comprising a computer and a storage medium, it is possible to have the computer analyze and compare values for the present weather conditions to other stored values. The computer may then control the foundation in such a manner that the foundation is placed in an advantageous position in relation to the windmill and in accordance with the given weather conditions in relation to the surface.

By letting at least one windmill on the foundation comprise a one-piece or a two-piece tower which is connected to the foundation by at least one wire or stiffener, and preferably from the top of the tower down to one or more of the ends of the foundation, it is possible to obtain an advantageous embodiment of the invention.

Often, such a tower will not be stable in itself by means of its fixation to the foundation. By means of a stiffener known from e.g. sailboats, it is possible to obtain an extra strong and stable construction against the roughness of nature.

By letting at least one windmill comprise a three-piece or further divided tower, it is possible to create a tower which is stable without requiring a stiffener. This includes a four-piece tower where each of the four legs may be placed at the ends of the two pontoons. Correspondingly, a three-piece tower may advantageously be utilized on a foundation comprising 3 pontoons where one leg is led to each pontoon.

Also, it is possible by means of one or more stiffeners to raise or lower the windmill completely or partially. This option is extra flexible if a lever function, such as e.g. lever fastener, has been mounted in the tower and continues down into the foundation.

By at least one windmill being of the down-wind type, it is possible to adjust the size of the swept area of the rotor to a larger degree.

By at least one of the rotors of the windmill comprising means making angling of the rotor away from the tower of the windmill possible, it is possible to adjust the size of the swept area of the rotor in a simple mechanical way. Hereby, e.g. the strain on the anchor and the anchor rope or chain may be limited while also stabilizing the entire energy generating device. A further advantage is that the rotor may be made more flexible. This is an advantage in regard to the weight of especially the rotor and the tower which may be somewhat lighter than those of an upwind windmill.

By said angling being possible since the rotor is pivotally mounted on the windmill axis by means of one or more bearings, it is possible to change the swept area radically and to collapse the rotor completely if necessary so that no area is swept at all.

By letting the degree of angling of said rotor be controlled on the basis of the forces affecting the rotor, it is possible to control the angling in such a manner that an advantageous relation between the desire to protect the energy generating device as much as possible and to optimize energy production is obtained.

By letting the degree of angling of said rotor be controlled on the basis of the centrifugal forces on the rotor, it is possible to limit the physical forces on the rotor and thereby the wear and tear on the rotor and the components in close proximity hereof. Also, the force is an expression of the wind pressure on the tower and the rotor, and control based on the measurements of this force may contribute to further stabilization of the energy generating device and thereby form part of the total control of the energy generating device, incl. the control of the amount of liquid in the foundation.

By letting the degree of angling of said rotor be controlled on the basis of the amount of electrical energy which may or shall be produced by one or more generators of the energy generating device, it is also possible to protect the electric components in the energy generating device against overload and limit or optimise energy production during certain periods, if necessary.

By placing one or more generators on or in immediate proximity of the foundation, it is possible to shift the center of gravity of the energy generating device closer to sea level. By reducing the center of gravity, it will be easier to stabilize the rotor so that it moves as little as possible, especially since the amounts of liquid to be shifted in the foundation are reduced. In addition, the construction makes service check-ups etc. much easier.

In one embodiment of the invention, it may be advantageous to use a multi-poled alternator since it will thereby be possible to avoid gearing between the rotor and the generator. The weight, which is subsequently concentrated at the top, will primarily be made up by the rotor and the necessary shafts and break systems which in itself will present a significant reduction of weight in relation to windmills of the known kind.

By letting said generators be connected to the drive shaft of the windmill by a shaft arrangement, an effective mechanical transfer of energy from the rotors to the generator(s) has been obtained.

By letting the wind speed or wave size be measured by detectors placed at the front of the foundation, a preferred embodiment of the invention has been obtained.

It should be mentioned that the weather conditions on the mounting locations will generally vary but not from one second to another and this means that the requirements to the control systems neutralizing the movements before transferring them to the energy generating device will be stable. Also, the change in movements will not be significant for long periods of time and the corresponding control will therefore be equally limited in relation to the degree and swiftness of counter-measures. Generally, the angle of the rotor may be changed very quickly allowing quick responses to changes in e.g. the wind force. The shifting of liquid in the foundation will be advantageous in relation to relatively stable movements of the sea.

BRIEF DESCRIPTION OF THE DRAWINGS

The invention will be described in detail in the following with reference to the figures, in which.

DETAILED DESCRIPTION OF THE INVENTION

Figure 1:
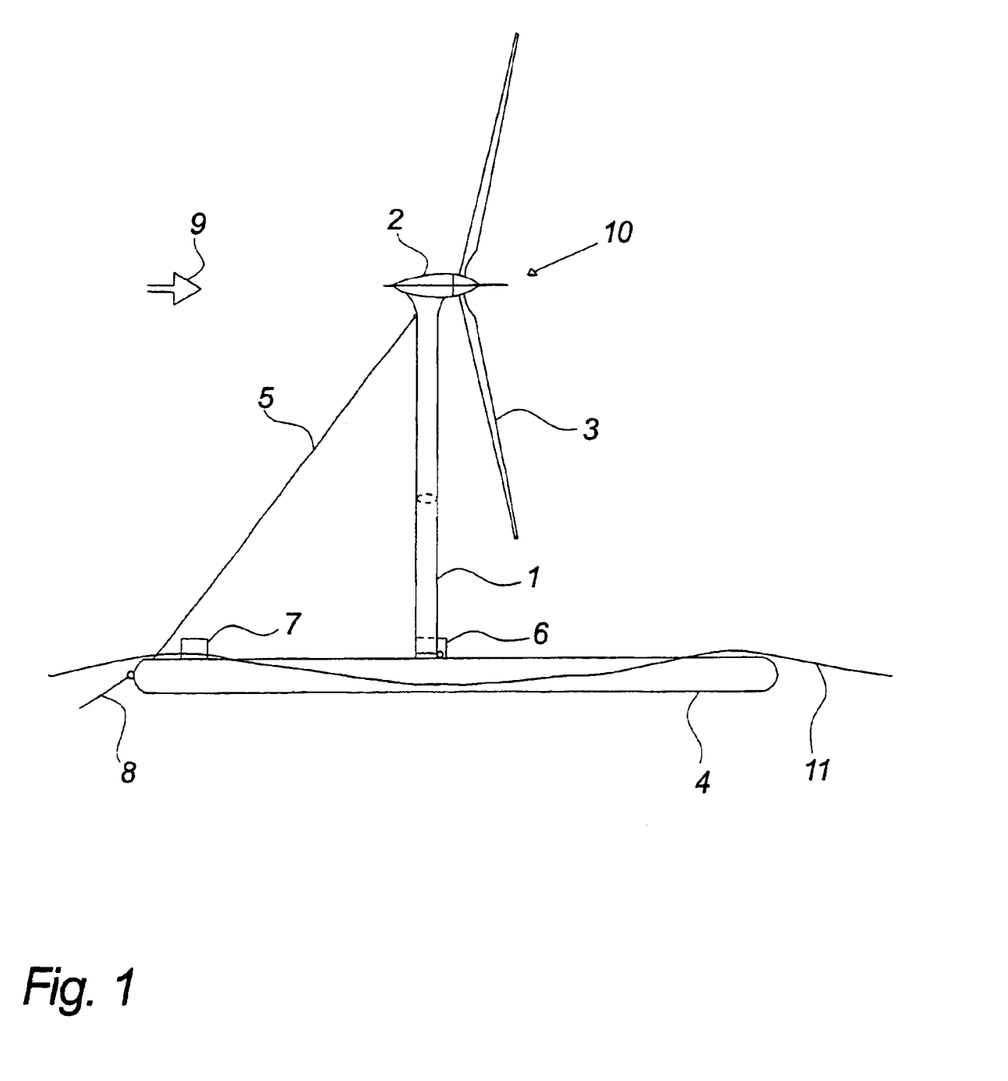
FIG. 1 shows an embodiment of an maritime energy generating device according to the invention from the side.

FIG. 1 shows an example of an embodiment of a maritime energy generating device including a windmill 10 generating electricity which is suitable for mounting at a location at sea, at a lake, an inlet or another water area of a certain depth.

The foundation 4 of the energy generating device is built as a raft comprising two cylindrical carrying pontoons 4a, 4b which have been mutually connected by a number of cross-bars 15. However, it will also be possible to construct the raft in a different way, including the use of several carrying pontoons or alternatively with only one hull, which should naturally be in an essentially even plane below the water surface and have a certain size in order to provide the necessary stability.

The raft should be designed to lie so deep in the water that large waves can wash over it. In this manner, it is possible to stabilize the windmill at high seas.

The location of the raft in the water, incl. depth and heeling in the long and transverse direction, will be affected by the wind speed, the waves, axial forces, gyro forces etc. Thus, it is advantageous to provide the raft with water tanks and pump units which may ensure that the raft is in a horizontal or essentially horizontal position by means of level sensors irrespective of the impact of the wind, waves and the rotor 3 of the windmill.

At the mounting location, the windmill will be anchored to the bottom of the sea by means of an anchor which is connected to the foundation 4 by means of an anchor rope or chain 8. Furthermore, the anchor chain may advantageously be provided with a sea cable. The sea cable transfers the electricity produced by the windmill to a fixed cable installation at the bottom of the sea, from which the produced electricity is led to shore. However, a direct connection to shore would also be possible, just as it is possible to transform the produced electricity into another form of energy to be stored locally and subsequently picked up by ship. Also, the produced electricity may be transformed into DC voltage and stored on a number of batteries.

In the figure, the stiffeners are shown with one or more wires 5 in the front part of the carrying pontoons. Thus, the stiffeners may be designed with a hinge 6 at the bottom so that the windmill may be risen or lowered without the assistance of a load crane.

The machine compartment 2 comprises the usual such as windmill gear, generator etc. Also, the rotor 3 has been placed at one end of the machine compartment 2 in the usual manner and may be designed in accordance with all known principles of windmill rotors. In FIG. 1, the windmill is illustrated as a down-wind type. However, by changing the tower composition, the rotor may be placed at the front of the machine compartment as an upwind type.

Figure 2:
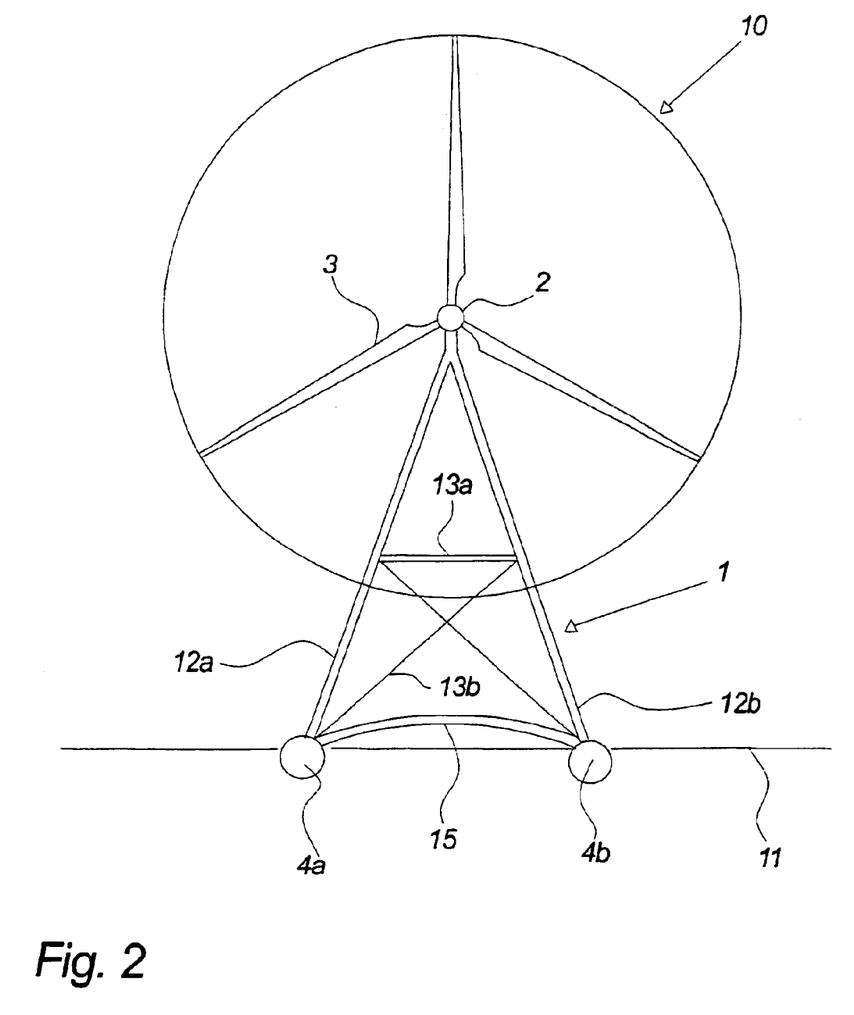
FIG. 2 shows the energy generating device from the front.

FIG. 2 shows a two-piece tower with a slim profile in the direction of the wind in order for the windmill tower to cause as little wind shadow as possible for the rotor 3.

Furthermore, it can be seen that the tower construction 1 of the windmill comprises two aerodynamically shaped supporting posts 12a, 12b, each carried by a carrying pontoon 4a, 4b at the bottom and joined right below the machine compartment 2 at the top. In order to ensure a stiff tower construction, a horizontal stiffener 13a and crossed stiffening wires 13b have been placed between the supporting posts 12a, 12b.

Alternatively, the tower may be a one-piece tower which may e.g. be stiffened by additional stiffeners or wires down to the foundation. In this case, it will still be possible to limit the wind shadow by designing the tower in a shape corresponding to that of the wing profile or the like which would limit the profile and make it aerodynamic in the direction of the wind.

Correspondingly, it is possible to divide the tower into parts in excess of two whereby the tower is provided with the necessary stability without requiring stiffeners.

Figure 3:
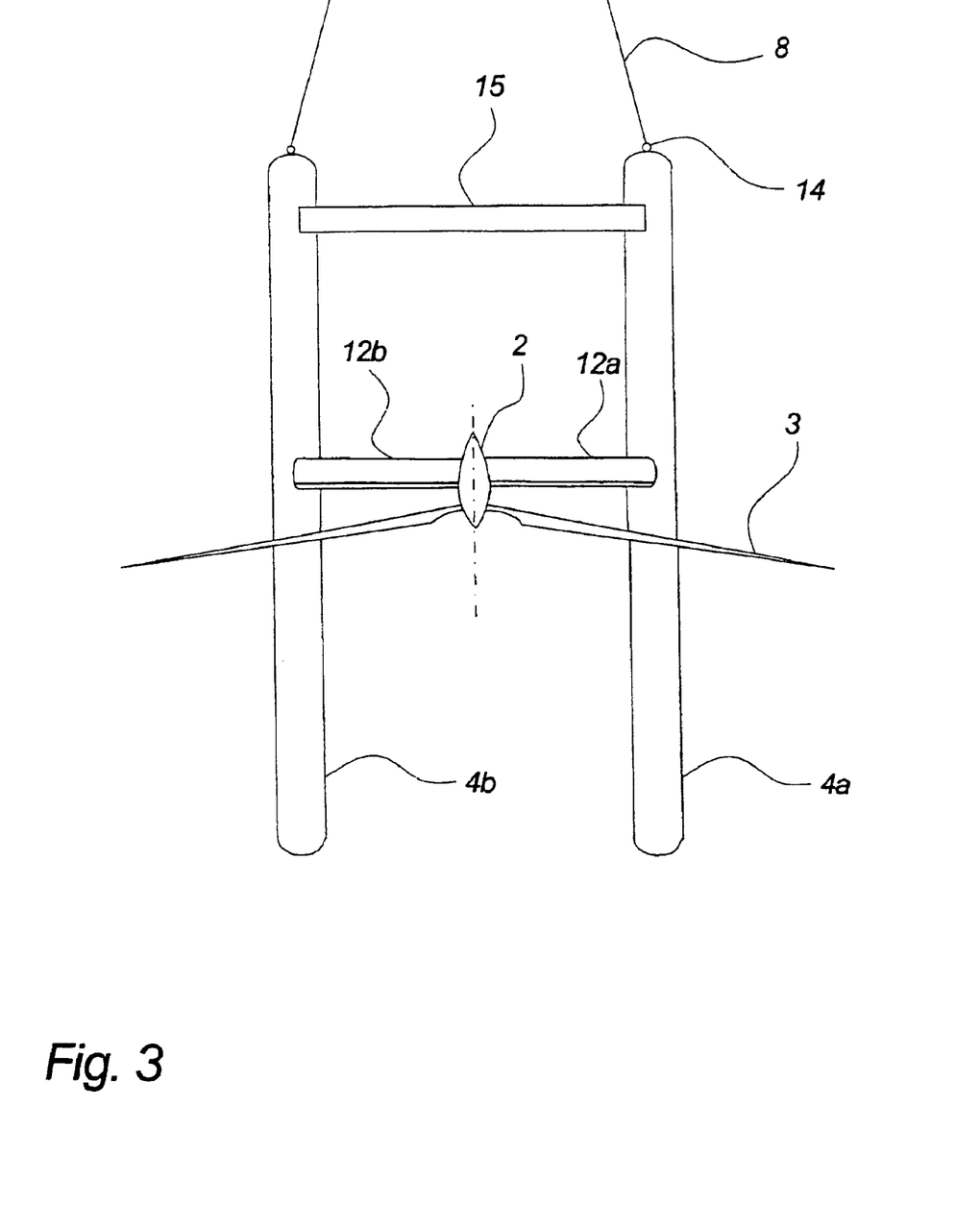
FIG. 3 shows the energy generating device from the top.

FIG. 3 shows the maritime energy generating device in a preferred embodiment seen from above. The machine compartment 2 is fixedly anchored to the tower construction 1 which means that the windmill has no yaw mechanism.

Thus, the windmill only yawns by means of the foundation 4 yawning with the fixation to the bottom of the sea as the center of rotation. Experiences have shown that the wind rarely turns 360 degrees or more and convultion of the sea cable or anchor rope or chain 8 will therefore not be a problem.

The anchor rope or chain 8 is shown in FIG. 3 by means of two ropes or chains connected to the same anchor, each rope or chain being connected to a point of fixation 14 on each pontoon 4a, 4b.

Alternatively, the anchor rope or chain 8 may be connected at a certain point on the foundation such a e.g. near the windmill itself in order to have the fixation as close to the center of gravity of the maritime energy generating device as possible.

If the windmill is alternatively designed with a standard yaw mechanism, it will be necessary to fix the foundation to several mutually displaced anchors in order to ensure that the foundation 4 will not yawn as well.

The tower of the windmill will furthermore be designed to mainly absorb the axial forces from one direction. The tower of the windmill may be constructed as a solid tower or a mesh construction.

Similarly, other windmill constructions and types will be useable on the foundation without problems. This includes a windmill reconstructed with a vertical axis e.g. in accordance with the Darreius principle.

Correspondingly, several windmills 10 may share a foundation 4 which means that certain installations besides the foundation, including e.g. certain electrical connections and the cable for transfer of the electricity production, may be shared. If the foundation comprises two or more pontoons, it will be possible to e.g. place a windmill on each pontoon.

Figure 4A:
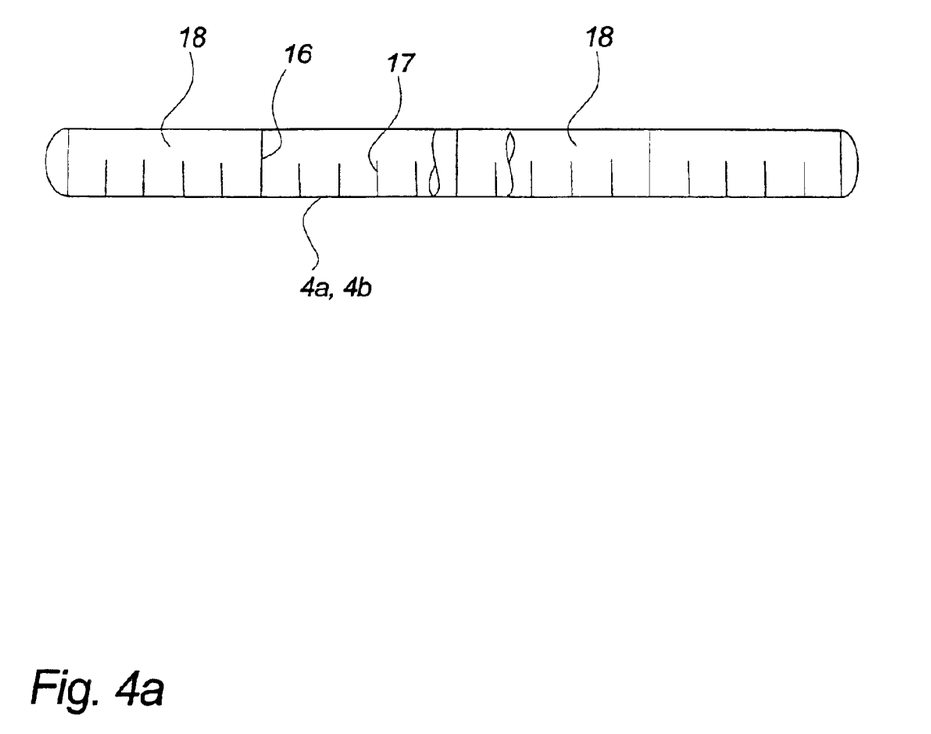
FIG. 4a shows a pontoon used in connection with a foundation of an energy generating device.

FIG. 4a shows the inside of a pontoon 4a, 4b for use in connection with a foundation 4. The pontoon features a number of bulkheads of different types where the first type 16 divides the pontoon into a number of tanks 18. These tanks will contain liquid in the shape of water and are mutually separated by means of the mentioned bulkheads 16.

Figure 4B:
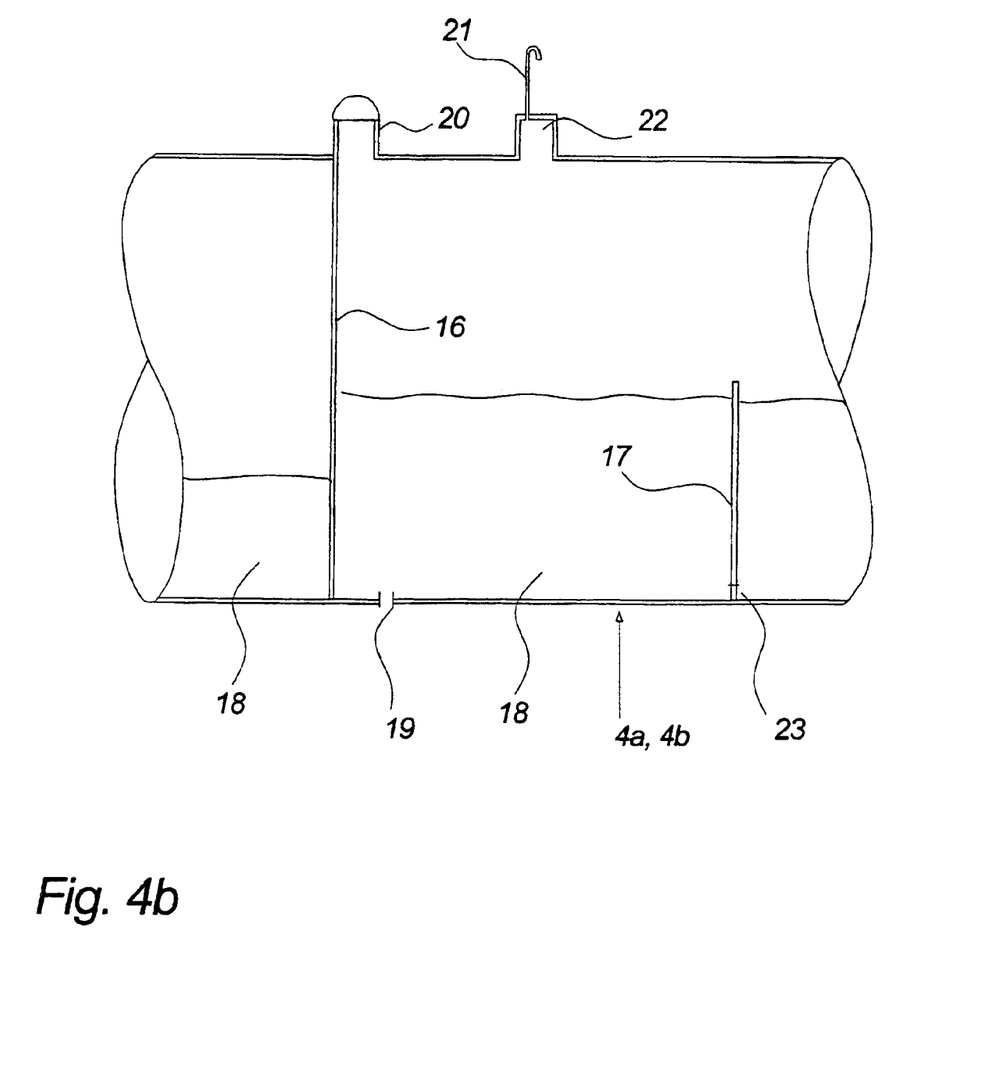
FIGS. 4b & 4c show a section of a pontoon seen from the front and the side.

FIG. 4b shows a cross section of a pontoon 4a, 4b. As mentioned, the pontoon comprises a number of tanks 18, the sides of which are defined by the bulkheads 16. In addition, a tank 18 comprises number of bulkheads of another type 17 which are not quite as high. In this manner, it is ensured that the liquid in a given tank 18 "baffles" back and forth. An opening 24 is featured over each bulkhead 17 (shown in FIG. 4c) ensuring passage for inspection of the entire tank 18 and to which access is gained through the inspection hatch 20. At the bottom of the hull 17, a drain opening 22 is featured which ensures that the levels of liquid between the various areas of a tank may be evened out relatively quickly.

The amount of liquid in a given tank may be changed by means of a unit 23 for shifting liquid. The unit may e.g. shift liquid from a tank in the rear part of the foundation to another tank or tanks at the front of the foundation. Hereby, it is possible to compensate for movements initialised by waves. Further, the unit may shift liquid in or out of the tank or tanks by raising or lowering the windmill or part of the windmill.

Figure 4C:
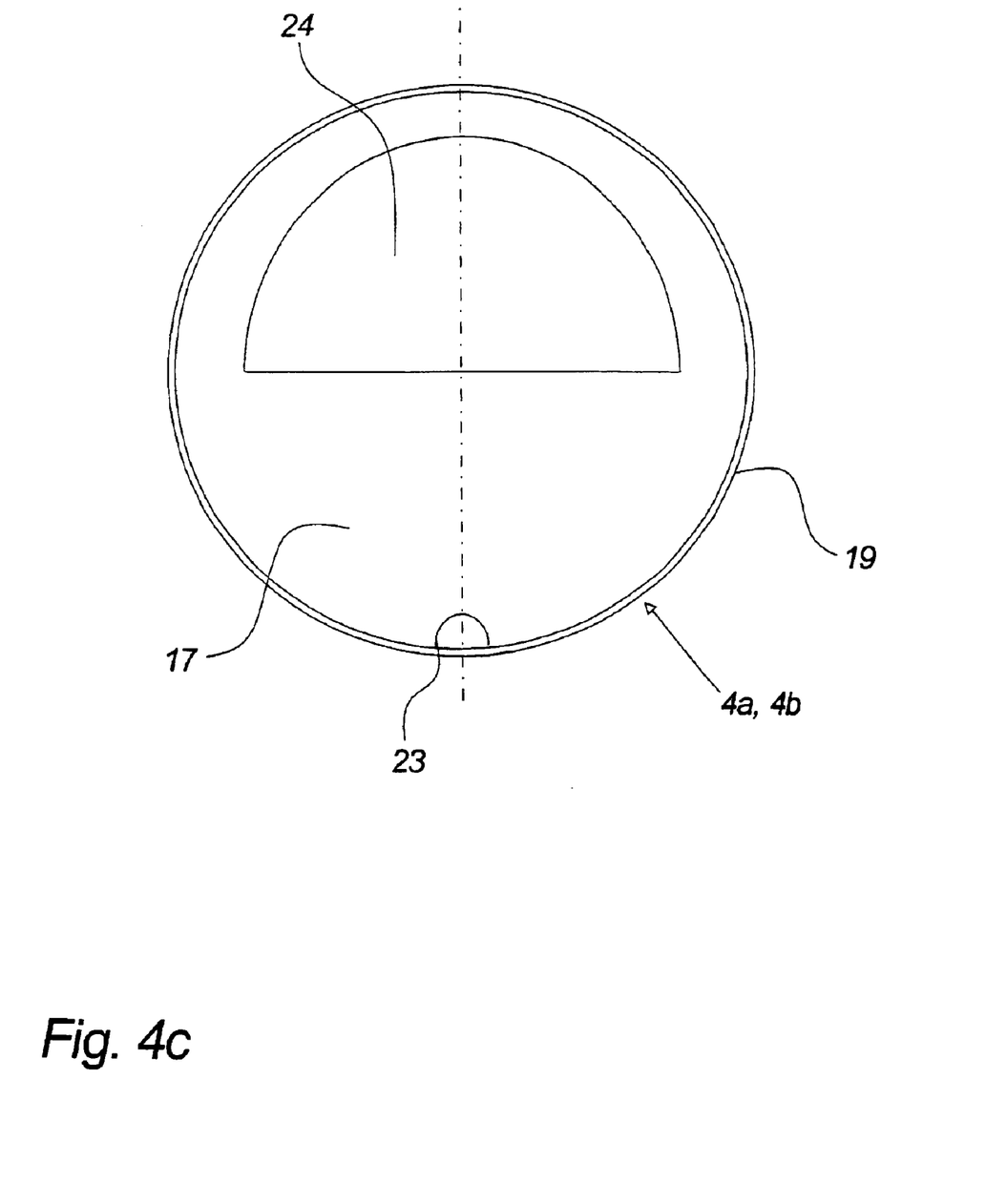

FIG. 4c shows a section down through a pontoon by a bulkhead 17 of the second type.

Figure 5:
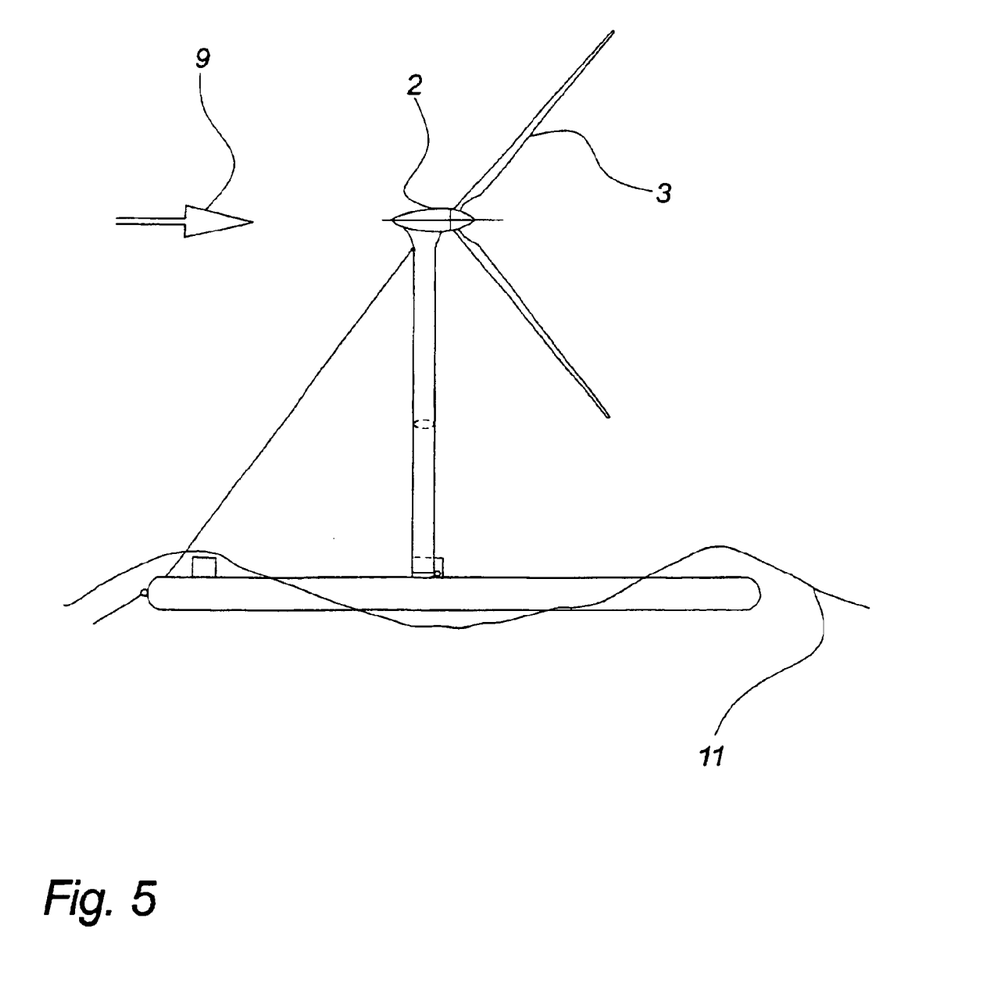
FIG. 5 shows a windmill with a backward angled rotor.

FIG. 5 shows an example of a control principle of the rotor of the windmill 3. As opposed to the windmill shown in FIG. 1, the wind arrow 9 and the surface/the waves 11 suggest that the weather conditions have become rougher. In order to ensure continued stable production of energy by the windmill, it is possible to limit the area swept by the rotor 3 by angling the rotor backwards and away from the windmill. The angling of the rotor is obtained by means of the bearings in the individual rotor wings being positioned immediately before they connect with the joint drive shaft.

The angling may be gradual or continuous and may be controlled on the basis of measurements of several different parameters. Potential parameters may be wind speed or wave size where the wind speed and wave size could be measured at the front of the energy generating device e.g. by detectors on a mast. The position at the front allows quick response to changes since the wind speed or wave size is detected well before it reaches the rotor of the windmill or the foundation. Also, the centrifugal forces applied to the rotor wings may constitute a parameter. Correspondingly, the production of energy by one or more generators may be used as a parameter when e.g. determining a potential angling of the rotor and the size hereof.

In a practical embodiment of the invention for mounting at open sea (depth more than 5–10 metres), the pontoon will have a length of approx. 200 meters, a hub height of 120 and a rotor radius of 80 meters which will provide a nominal generator effect of 8MW on the basis of a swept area of 20,000 m2.

What is claimed is:

1. A maritime energy generating device comprising:
    a floating foundation;
    a windmill mounted on said floating foundation;
    a tower;
    a machine compartment mounted at a top of the tower; and
    a connection for fixing said floating foundation to a bottom of a water body;
    wherein the foundation comprises two tanks and a unit for shifting liquid between the tanks or the tanks and the surroundings.

2. The maritime energy generating device according to claim 1, wherein the tower is aerodynamic in a direction of wind.

3. The maritime energy generating device according to claim 1, wherein the tower is slimmer in a direction of wind than in a cross direction of the wind.

4. The maritime energy generating device according to claim 1, wherein the connection is an anchor rope or chain.

5. The maritime energy generating device according to claim 1, further comprising a connection to an electrical cable for transfer of energy produced by the energy generating device to a place of use.

6. The maritime energy generating device according to claim 1, wherein the foundation is fixed to the bottom of the water body by an anchor.

7. The maritime energy generating device according to claim 1, wherein the foundation is rectangular in a direction of wind.

8. The maritime energy generating device according to claim 1, wherein the foundation includes two pontoons connected by a crossbar.

9. The maritime energy generating device according to claim 1, wherein the foundation comprises bulkheads on an inside which divide the foundation into two tanks.

10. The maritime energy generating device according to claim 1, wherein at least one of the tanks comprises open bulkheads.

11. The maritime energy generating device according to claim 1, wherein at least one of the tanks includes a drain opening formed at a bottom of the tank.

12. The maritime energy generating device according to claim 1, wherein at least one of the tanks includes a pressure compensation device.

13. The maritime energy generating device according to claim 1, wherein the unit for shifting liquid comprises a compressor for changing air pressure in one or more of the tanks.

14. The maritime energy generating device according to claim 1, wherein the unit for shifting liquid comprises a pump.

15. The maritime energy generating device according to claim 1, wherein each of the two pontoons includes two tanks and a pump for pumping liquid between the tanks or the tanks and the surroundings.

16. The maritime energy generating device according to claim 1, wherein the unit for shifting of liquid is controlled by an angle and level measuring device disposed on said energy generating device.

17. The maritime energy generating device according to claim 16, wherein the angle and level measuring device comprises a computer and a storage medium.

18. The maritime energy generating device according to claim 1, wherein the windmill comprises a one-piece tower connected to the foundation by a wire from a top of the tower down to an end of the foundation.

19. The maritime energy generating device according to claim 1, wherein the windmill comprises a three-piece divided tower.

20. The maritime energy generating device according to claim 1, wherein the windmill is of the down-wind type.

21. The maritime energy generating device according to claim 20, wherein the windmill comprises a rotor including means for angling the rotor away from the tower.

22. The maritime energy generating device according to claim 1, wherein said means for angling comprising one or more bearings pivotally mounting said rotor on an axis of the windmill.

23. The maritime energy generating device according to claim 22, wherein a degree of angling of said rotor is controlled by forces affecting the rotor.

24. The maritime energy generating device according to claim 23, wherein said forces comprise centrifugal forces.

25. The maritime energy generating device according to claim 23, wherein a degree of angling of said rotor is controlled by an amount of electrical energy produced by a generator of the energy generating device.

26. The maritime energy generating device according to claim 1, further comprising a generator disposed on the foundation.

27. The maritime energy generating device according to claim 26, wherein said generator is connected to a drive shaft of the windmill by a shaft arrangement.

28. The maritime energy generating device according to claim 1, wherein the wind speed or wave size is measured by detectors disposed at a front of the foundation.

* * * * *